US 9,151,632 B2

(12) United States Patent
Lim et al.

(10) Patent No.: US 9,151,632 B2
(45) Date of Patent: Oct. 6, 2015

(54) METHOD AND SYSTEM FOR PROVIDING DRIVING ROUTE INFORMATION OF ELECTRIC VEHICLE

(71) Applicant: Hyundai Motor Company, Seoul (KR)

(72) Inventors: Hye Kyoung Lim, Seoul (KR); Seung-Chang Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 5 days.

(21) Appl. No.: 14/141,818

(22) Filed: Dec. 27, 2013

(65) Prior Publication Data

US 2015/0073631 A1 Mar. 12, 2015

(30) Foreign Application Priority Data

Sep. 6, 2013 (KR) .................. 10-2013-0107422

(51) Int. Cl.
*G01C 21/34* (2006.01)
*G08G 1/0968* (2006.01)
*G01C 21/36* (2006.01)

(52) U.S. Cl.
CPC ............ *G01C 21/3469* (2013.01); *G01C 21/34* (2013.01); *G01C 21/3697* (2013.01); *G08G 1/096816* (2013.01); *G08G 1/096838* (2013.01); *G01C 21/3667* (2013.01); *G08G 1/096866* (2013.01); *Y02T 90/161* (2013.01)

(58) Field of Classification Search
CPC ............... G01C 21/34; G01C 21/3469; G01C 21/3667; G01C 21/3682; G01C 21/3697; G08G 1/096811; G08G 1/096816; G08G 1/096838; G08G 1/096866; G08G 1/096888; Y02T 90/161
See application file for complete search history.

(56) References Cited

U.S. PATENT DOCUMENTS

| 2010/0087977 | A1* | 4/2010 | Bonne ............................. 701/22 |
| 2011/0060495 | A1* | 3/2011 | Kono et al. .................... 701/33 |
| 2011/0160990 | A1* | 6/2011 | Mineta ......................... 701/123 |
| 2011/0288765 | A1* | 11/2011 | Conway ........................ 701/201 |
| 2012/0136574 | A1* | 5/2012 | Kobayashi et al. ........... 701/533 |
| 2012/0203409 | A1* | 8/2012 | Sekijima et al. ............... 701/22 |
| 2012/0215432 | A1* | 8/2012 | Uyeki ........................... 701/118 |
| 2013/0218366 | A1* | 8/2013 | Fukuda et al. .................... 701/1 |
| 2013/0261966 | A1* | 10/2013 | Wang et al. .................. 701/533 |
| 2015/0160029 | A1* | 6/2015 | Kobayashi ......... G01C 21/3469 |

FOREIGN PATENT DOCUMENTS

| JP | 2009-031046 A | 2/2009 |
| JP | 2012-189466 A | 10/2012 |
| JP | 2013-228238 | * 11/2013 |

(Continued)

*Primary Examiner* — Michael J Zanelli
(74) *Attorney, Agent, or Firm* — McDermott Will & Emery LLP (57) ABSTRACT

A method and a system implemented for providing driving route information of an electric vehicle to a telematics terminal by a telematics server may include checking a driving pattern of a driver corresponding to the electric vehicle; checking information on a current position and a destination of the electric vehicle; calculating at least one candidate route from the current position to the destination; calculating expected power consumption corresponding to each of the at least one candidate routes based on the driving pattern, the current position, and the destination; and transmitting information on the at least one candidate route and the expected power consumption corresponding thereto to the telematics terminal.

15 Claims, 4 Drawing Sheets

(56) References Cited

FOREIGN PATENT DOCUMENTS

| KR | 10-2012-0002093 A | 1/2012 |
| KR | 10-2012-0036563 A | 4/2012 |
| KR | 10-2012-0116162 A | 10/2012 |
| KR | 10-2013-0020468 A | 2/2013 |
| KR | 10-2013-0052897 A | 5/2013 |

* cited by examiner

METHOD AND SYSTEM FOR PROVIDING DRIVING ROUTE INFORMATION OF ELECTRIC VEHICLE

CROSS-REFERENCE TO RELATED APPLICATION

This application claims priority to and the benefit of Korean Patent Application No. 10-2013-0107422 filed in the Korean Intellectual Property Office on Sep. 6, 2013, the entire contents of which are incorporated herein by reference.

BACKGROUND (a) Technical Field

The present disclosure relates generally to a method and a system for providing driving route information of an electric vehicle. More particularly, the disclosure relates to a method and a system for providing driving router information of an electric vehicle, which calculate expected power consumption based on a driving pattern of a driver if a destination is set through a telematics service, and provide driving route information and charging station information based on the expected power consumption and current power amount.

(b) Description of the Related Art

Telematics is a term in which telecommunication is combined with informatics, and is defined as next generation information providing services for a vehicle through a combination of the automotive industry and the IT industry in which wireless communication, a vehicle terminal, contents, and the like are organically related with each other.

A telematics service may provide various services, such as traffic and driving information, emergency situation response information, remote vehicle diagnostic service, and internet, by utilizing wireless communication technology and global positioning system (GPS) technology.

In general, drivers have different driving patterns. Therefore, although specifications among electric vehicles are the same, power consumption may be changed substantially according to a driving pattern of each driver.

Further, a driving pattern of a driver is not constant and changes according to temporary changes in the driver's mood or driving intention, road conditions, and so on. Therefore, power consumption of a battery may be changed substantially. As a result, when only the present power amount is guided, it is difficult for the driver to determine a charging time point.

Electric power costs at each charging station may be changed according to the time of day. That is, electric power cost may be high at a time when power usage amount is high, and may be lower at a time when power usage amount is low. Therefore, electric power cost of a charging station may be changed according to an arrival time of the electric vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a system for providing driving route information of an electric vehicle having advantages of calculating expected power consumption and at least one candidate route based on a driving pattern of a driver if a destination is set, and providing information on the expected power consumption and expected cost of each charging station.

An exemplary embodiment of the present invention provides a method for providing driving route information of an electric vehicle to a telematics terminal by a telematics server, including: checking a driving pattern of a driver corresponding to the electric vehicle; checking information on a current position and a destination of the electric vehicle; calculating at least one candidate route from the current position to the destination; calculating expected power consumption corresponding to each of the at least one candidate routes based on the driving pattern, the current position, and the destination; and transmitting information on the at least one candidate route and the expected power consumption corresponding thereto to the telematics terminal.

The driving pattern of the driver may be calculated based on driving information of the electric vehicle stored in a database.

The method may further include: checking average power consumption corresponding to each of the at least one candidate routes; and transmitting information on the average power consumption to the telematics terminal.

The method may further include: receiving information on a desired route selected from among the at least one candidate route from the telematics terminal; calculating expected cost of each charging station based on charging station information, the driving pattern, and the desired route; and transmitting information on the expected cost of each charging station to the telematics terminal.

The method may further include: receiving information on a selected charging station from the telematics terminal; calculating a route passing the selected charging station; and transmitting information on the route passing the selected charging station.

The method may further include: updating the expected power consumption according to the route passing the selected charging station; and transmitting updated information on the expected power consumption to the telematics terminal.

An exemplary embodiment of the present invention provides a method for providing driving route information of an electric vehicle by a telematics terminal, including: transmitting driving information including a current position of the electric vehicle and information on a destination to a telematics server; receiving information on at least one candidate route from the current position to the destination and expected power consumption corresponding thereto from the telematics server; and displaying the at least one candidate route and the expected power consumption corresponding thereto.

The method may further include: receiving average power consumption corresponding to each of the at least one candidate routes from the telematics server; and displaying the average power consumption.

The method may further include: transmitting information on a desired route selected from among the at least one candidate route to the telematics server; receiving information on expected cost of each charging station from the telematics server; and displaying the expected cost of each charging station.

The method may further include: transmitting information on a selected charging station to the telematics server; receiving information on a route passing the selected charging station from the telematics server; and displaying the route passing the selected charging station.

The method may further include: receiving updated information on the expected power consumption according to the route passing the selected charging station from the telematics server; and displaying the updated information on the expected power consumption.

An exemplary embodiment of the present invention provides a telematics terminal for providing driving route information of an electric vehicle, including: an information collector configured to collect driving information of the electric vehicle; a terminal communicator configured to communicate with a telematics server; an input interface configured to receive information on a destination from a user; an output display configured to display an electronic map; and a terminal controller configured to control the terminal communicator so as to transmit the driving information to the telematics server and the output display so as to display at least one candidate route from a current position of the electric vehicle to the destination and expected power consumption corresponding thereto The terminal controller may control the output display so as to display average power consumption corresponding to each of the at least one candidate routes.

The terminal controller may control the output display so as to display expected cost of each charging station.

If a charging station is selected, the terminal controller may control the output display so as to display a route passing the selected charging station.

The telematics controller may control the output display so as to display updated information on the expected power consumption according to the route passing the selected charging station.

An exemplary embodiment of the present invention provides a telematics server for providing driving route information of an electric vehicle, including: a server communicator configured to communicate with a telematics terminal and charging stations; a database configured to store driving information received from the telematics terminal and charging station information received from the charging stations; and a server controller configured to process transmitted/received information through the server communication unit and information stored in the database, wherein the controller is operated by a predetermined program. The predetermined program performs: checking a driving pattern of a driver corresponding to the electric vehicle; checking information on a current position and a destination of the electric vehicle; calculating at least one candidate route from the current position to the destination; calculating expected power consumption corresponding to the at least one candidate route based on the driving pattern, the current position, and the destination; and transmitting information on the at least one candidate route and the expected power consumption corresponding thereto to the telematics terminal.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
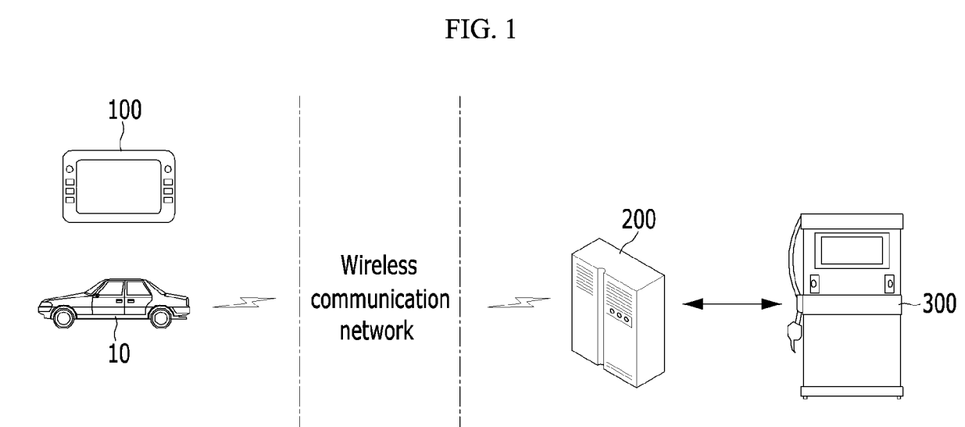
FIG. 1 is a network diagram schematically illustrating a configuration of a system for providing driving route information of an electric vehicle according to an exemplary embodiment of the present invention.

FIG. 1 is a network diagram schematically illustrating a configuration of a system for providing driving route information of an electric vehicle according to an exemplary embodiment of the present invention.

Referring to FIG. 1, a system for providing driving route information of an electric vehicle according to an exemplary embodiment of the present invention includes a telematics terminal 100 provided in the electric vehicle 10 and a telematics server 200 provided in a telematics center.

The telematics terminal 100 may be a wireless communication device such as a smartphone, a tablet PC, a personal digital assistant (PDA), and a navigation device.

The telematics terminal 100 collects driving information and transmits the collected information to the telematics server 200 through a wired or wireless communication network.

The driving information may include driver personal information, driving distance information, driving time information, vehicle speed information, acceleration and deceleration information, battery information, and current position information.

The driver personal information may include information for customer authentication. The driving distance information may include information on a driving distance of the electric vehicle based on a term (e.g., daily, weekly, or monthly). The driving time information may include information on a driving time of the electric vehicle based on a term (e.g., daily, weekly, or monthly). The battery information may include information on a type of a battery and a state of charge (SOC) of the battery.

The telematics server 200 stores the driving information received from the telematics terminal 100, and calculates a driving pattern of a driver based on the stored information. That is, as the information received from the telematics terminal 100 increases, the telematics server 200 can calculate a more accurate driving pattern of the driver.

Alternatively, the telematics terminal 100 may calculate the driving pattern of the driver and transmit the driving pattern to the telematics server 200.

The telematics server 200 may calculate power consumption information based on the driving pattern. The power consumption information may include average power consumption and expected power consumption.

In the present specification, "average power consumption" means an average of power consumption that is calculated based on position information and battery information that are received from a plurality of electric vehicles, when the plurality of electric vehicles move from a current position of the electric vehicle to a destination. In the present specification, "expected power consumption" means power amount required for driving that is calculated based on the driving pattern of the driver, when the electric vehicle moves from its current position to a destination.

A charging station 300 is a facility that supplies power to the electric vehicle 10, and may be connected with the telematics server 200 through a wired or wireless communication network. That is, the charging station 300 may transmit charging information to the telematics server 200 using a computer or a communication system that is provided in the charging station.

The charging information may include the location and electric power cost of the charging station 300. Here, the electric power cost may be changed according to time of day.

The telematics server 200 transmits the power consumption information and the charging information to the telematics terminal 100. At this time, the telematics server 200 may calculate and transmit at least one candidate route to the telematics terminal 100.

The telematics terminal 100 may display the power consumption information and the charging information. That is, the telematics terminal 100 may display current power amount, average power consumption, and expected power consumption. As a result, the driver can compare the average power consumption with the expected power consumption, and modify driving habits.

Further, the telematics terminal 100 may display expected cost of each charging station.

In the present specification, "expected cost of each charging station" means electric power cost at a time that the electric vehicle 10 is expected to arrive at each charging station.

The telematics terminal 100 may receive information on the expected cost from the telematics server 200. As a result, the driver can select a charging station that is cheaper or closer than other charging stations.

The telematics terminal 100 and the telematics server 200 according to the exemplary embodiment of the present invention will be described in more detail with reference to FIGS. 2 and 3.

Figure 2:
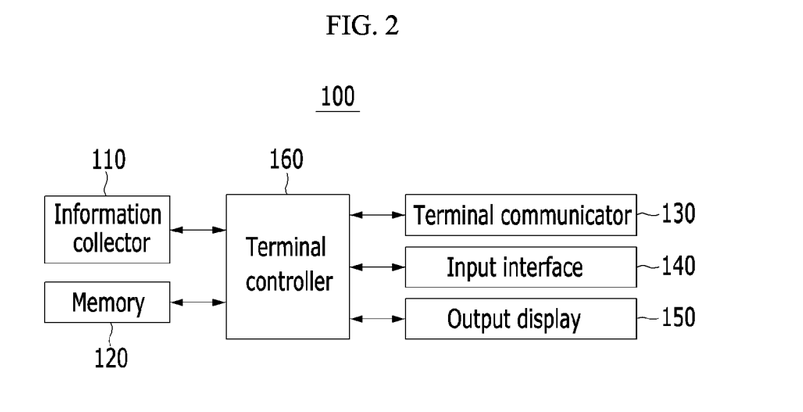
FIG. 2 is a block diagram schematically illustrating a telematics terminal according to an exemplary embodiment of the present invention.

FIG. 2 is a block diagram schematically illustrating the telematics terminal according to an exemplary embodiment of the present invention.

Referring to FIG. 2, telematics terminal 100 according to the exemplary embodiment of the present invention includes an information collector 110, a terminal communicator 130, an input interface 140, an output display 150, and a terminal controller 160. Further, the telematics terminal 100 may include a memory 120 for storing information collected by the information collector 110.

The information collector 110 may collect driving information outputted from electric control units that are mounted in the electric vehicle. The driving information may include driver personal information, driving distance information, driving time information, vehicle speed information, acceleration and deceleration information, battery information, and current position information.

The driving information may be transferred to the memory 120, and may be stored and classified in the memory 120.

The driving information collected by the information collector 110 is transferred to the terminal controller 160. Further, necessary information among the information stored in the memory 120 may be extracted and transferred to the terminal controller 160.

The terminal communicator 130 is a network interface, and may transmit the collected driving information and destination information to the telematics server 200 through a wired or wireless communication network. Further, the terminal communicator 130 may receive the power consumption information, at least one candidate route, and information on expected cost.

The input interface 140 receives information on a destination from a driver. When a destination is inputted by manipulation of the driver, the input interface 140 transfers a signal corresponding thereto to the terminal controller 160. The input interface 140 includes input means such as a keypad and a touchpad, and generates an input signal according to a user's selection.

The output display 150 may display an electronic map. The output display 150 may display average power consumption, expected power consumption, at least one candidate route, and expected cost of each charging station according to the control of the terminal controller 160. For example, the output display 150 may display a desired route selected by the driver on the electronic map, and display a position and expected cost of using each charging station.

The terminal controller 160 may be implemented with one or more microprocessors executed by a predetermined program, and the predetermined program may include a series of commands for performing each step included in a method for providing driving route information of the electric vehicle according to an exemplary embodiment of the present invention to be described below.

Figure 3:
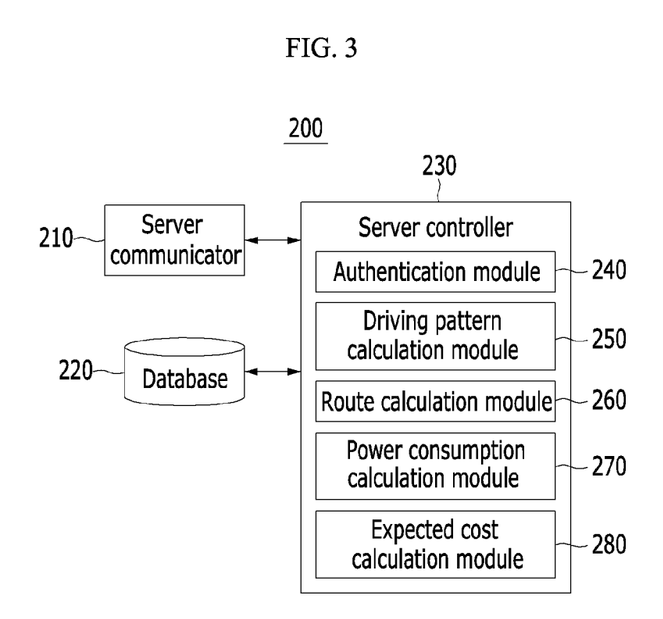
FIG. 3 is a block diagram schematically illustrating a telematics server according to an exemplary embodiment of the present invention.

FIG. 3 is a block diagram schematically illustrating a telematics server according to an exemplary embodiment of the present invention.

Referring to FIG. 3, the telematics server 200 according to an exemplary embodiment of the present invention includes a server communicator 210, a database 220, and a server controller 230.

The server communicator 210 is a network interface, and communicates with the telematics terminal 100 and the charging station 300. The server communicator 210 receives the driving information and the destination information from the telematics terminal 100, and receives the charging information from the charging station 300. The received information is stored and classified in the database 220. That is, as the information received from the plurality of telematics terminals is increased, the information accumulated in the database 220 is increased.

Further, the server communicator 210 may transmit power consumption information, at least one candidate route, and information on expected cost of each charging station to the telematics terminal 100. The power consumption information may include average power consumption and expected power consumption.

The driving information received from the telematics terminal 100 and charging information received from the charging station 300 are stored in the database 220. Further, the driving pattern of the driver and information on average power consumption are stored in the database 220.

The server controller 230 controls general operation of the telematics server 200. The server controller 230 may be implemented with one or more microprocessors operated by a predetermined program, and the predetermined program may include a series of commands for performing each step included in the method for providing the driving route information of the electric vehicle according to an exemplary embodiment of the present invention to be described below.

The server controller 230 may include an authentication module 240, a driving pattern calculation module 250, a route calculation module 260, a power consumption calculating module 270, and an expected cost calculation module 280.

The authentication module 240 performs a driver authentication operation in response to a request of the telematics terminal 100. The authentication module 240 may perform a driver authentication procedure based on pre-registered driver authentication information and received driver personal information.

The driving pattern calculation module 250 calculates a driving pattern of a driver based on the information accumulated in the database 220. The driving pattern calculation module 250 may calculate the driving pattern of the driver through a statistical analysis based on the driving distance information, the driving time information, the vehicle speed information, the acceleration and deceleration information, the battery information, and the current position information accumulated in the database 220. The calculated driving pattern of the driver is stored in the database 220. Alternatively, the telematics terminal 100 may calculate the driving pattern of the driver, and the driving pattern received from the telematics terminal 100 may be stored in the database 220.

The route calculation module 260 calculates at least one drivable candidate route from a current position of the electric vehicle to a destination. The route calculation module 260 may calculate a plurality of candidate routes through a minimum distance algorithm and a minimum time algorithm. Further, the route calculation module 260 may calculate an optimum route based on the driving pattern of the driver. The optimum route may be a route in which the expected power consumption is a minimum among the calculated candidate routes.

Further, if the driver sets a visiting location (e.g., a charging station selected by the driver) and the server communicator 210 receives information on the visiting location, the route calculation module 260 may calculate at least one route passing the visiting location.

The power consumption calculation module 270 calculates average power consumption and expected power consumption.

The power consumption calculation module 270 may calculate the average power consumption based on position information and battery information of a plurality of electric vehicles stored in the database 220.

The power consumption calculation module 270 may calculate expected power consumption corresponding to each of the at least one candidate routes based on the driving pattern of the driver stored in the database 220, the current position, and the destination.

The expected cost calculation module 280 calculates expected cost of each charging station. The expected cost of each charging station may be calculated based on charging station information, the driving pattern stored in the database 220, and a desired route selected from among the at least one candidate route. The server communicator 210 receives information on the desired route from the telematics terminal 100.

Figure 4:
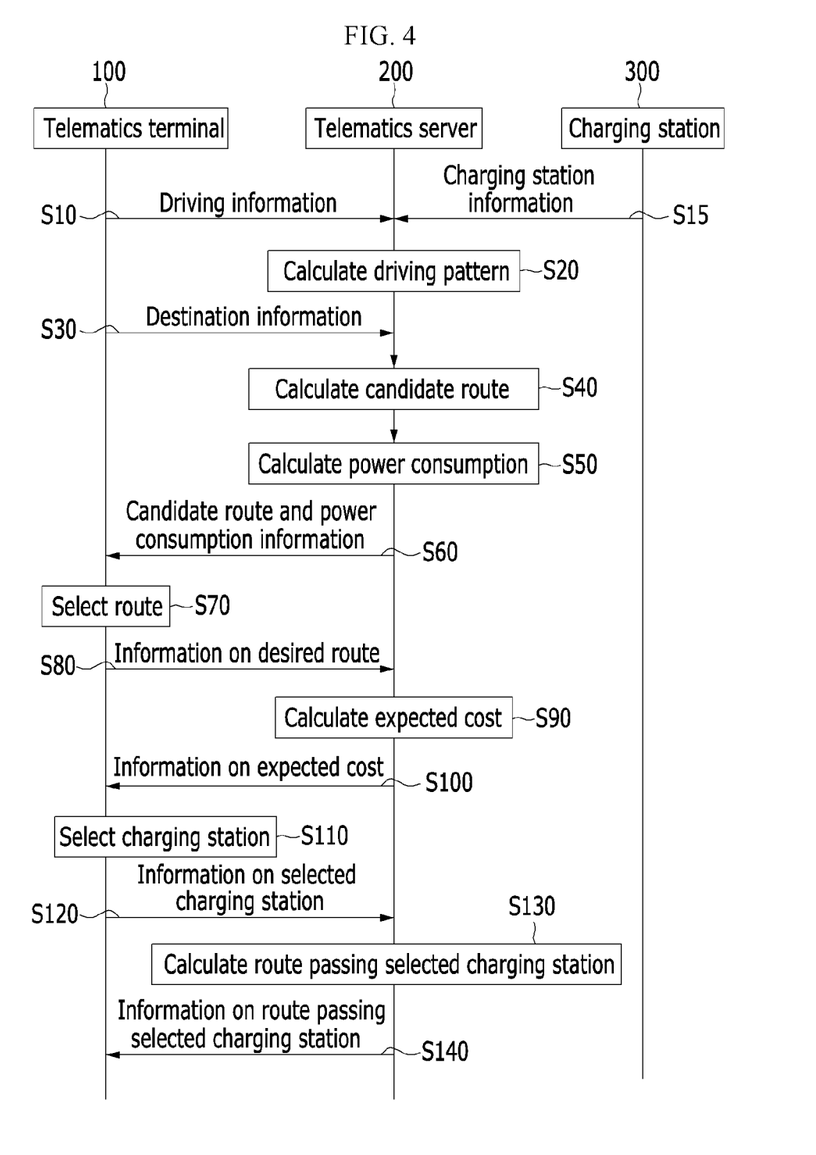
FIG. 4 is a flowchart illustrating a method for providing driving route information of an electric vehicle according to an exemplary embodiment of the present invention.

FIG. 4 is a flowchart illustrating a method for providing driving route information of an electric vehicle according to an exemplary embodiment of the present invention.

Referring to FIG. 4, the telematics terminal 100 transmits driving information including a current position of an electric vehicle 10 to the telematics server 200 at step S10.

The charging station 300 transmits charging information to the telematics server 200 at step S15. The charging information may include the location and electric power cost of the charging station 300. Here, the electric power cost may be changed according to a time of day. The telematics server 200 stores the charging information in the database 220.

The telematics server 200 stores the driving information in the database 220, and calculates a driving pattern of a driver based on the driving information accumulated in the database 220 at step S20. The calculated driving pattern is stored in the database 220.

If a destination is selected by the driver, the telematics terminal 100 transmits information on the destination to the telematics server 200 at step S30.

The telematics server 200 may calculate at least one candidate route drivable from the current position to the destination at step S40. The at least one candidate route may include a minimum time route, a minimum distance route, and an optimum route. The telematics server 200 checks the driving pattern of the driver corresponding to the electric vehicle 10, and calculates the optimum route based on the driving pattern.

The telematics server 200 calculates power consumption information at step S50. The telematics server 200 calculates expected power consumption corresponding to each of the at least one candidate route. Further, the telematics server 200 may calculate average power consumption corresponding to each of the at least one candidate route.

The average power consumption corresponding to each of the at least one candidate route may be calculated based on position information and battery information of a plurality of electric vehicles. The expected power consumption corresponding to each of the at least one candidate route may be calculated based on the driving pattern, the current position, and the destination.

The telematics server 200 transmits the at least one candidate route and the power consumption information to the telematics terminal 100 at step S60.

The telematics terminal 100 displays the at least one candidate route and the expected power consumption corresponding thereto. Further, the telematics terminal 100 may display the average power consumption corresponding to each of the at least one candidate route. If a desired route is selected among the at least one candidate route at step S70, the telematics terminal 100 transmits information on the desired route to the telematics server 200 at step S80.

The telematics server 200 calculates expected cost of each charging station at step S90. The expected cost of each charging station may be calculated based on the charging station information, the driving pattern stored in the database 220, and the desired route. At this time, the telematics server 200 may calculate the expected cost of each charging station for only at least one charging station existing within predetermined distance from the desired route.

The telematics server 200 transmits information on the expected cost of each charging station to the telematics terminal 100 at step S100. The telematics terminal 100 displays locations of the charging stations and the expected cost corresponding thereto. The telematics terminal 100 may display a category in an order from low expected cost. As a result, the driver can select a charging station according to the expected cost. Further, the driver can select a charging time point according to the expected power consumption.

If a charging station is selected at step S110, the telematics terminal 100 transmits information on the selected charging station to the telematics server 200 at step S120.

The telematics server 200 calculates a route passing the selected charging station at step S130. At this time, the telematics server 200 may update the average power consumption and the expected power consumption according to the route passing the selected charging station.

The telematics server 200 transmits information on the route passing the selected charging station to the telematics terminal 100 at step S140. At this time, the telematics server 200 may transmit updated power consumption information to the telematics terminal 100.

The telematics terminal 100 may display the route passing the selected charging station. Further, the telematics terminal 100 may display the updated expected power consumption and the updated average power consumption.

Therefore, according to an exemplary embodiment of the present invention, a driver may receive at least one candidate route and expected power consumption corresponding thereto that are calculated based on a driving pattern of the driver.

Further, the driver can select a charging station among a plurality of charging stations, and charge a battery at the selected charging station. Further, the driver can compare expected cost of each charging station to select a charging station.

Further, the driver can compare the average power consumption and the expected power consumption, and modify driving habits.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for providing driving route information of an electric vehicle to a telematics terminal by a telematics server, the method comprising:
    checking a driving pattern of a driver corresponding to the electric vehicle;
    checking information on a current position and a destination of the electric vehicle;
    calculating at least one candidate route from the current position to the destination;
    calculating expected power consumption corresponding to each of the at least one candidate routes based on the driving pattern, the current position, and the destination; and
    transmitting information on the at least one candidate route and the expected power consumption corresponding thereto to the telematics terminal.

2. The method of claim 1, wherein the driving pattern of the driver is calculated based on driving information of the electric vehicle stored in a database.

3. The method of claim 1, further comprising:
    checking average power consumption corresponding to each of the at least one candidate route; and
    transmitting information on the average power consumption to the telematics terminal.

4. The method of claim 1, further comprising:
    receiving information on a desired route selected from among the at least one candidate route from the telematics terminal;
    calculating expected cost of charging stations based on charging station information, the driving pattern, and the desired route; and
    transmitting information on the expected cost of the charging stations to the telematics terminal.

5. The method of claim 4, further comprising:
    receiving information on a selected charging station from the telematics terminal;
    calculating a route passing the selected charging station; and
    transmitting information on the route passing the selected charging station.

6. The method of claim 5, further comprising:
    updating the expected power consumption according to the route passing the selected charging station; and
    transmitting updated information on the expected power consumption to the telematics terminal.

7. A method for providing driving route information of an electric vehicle by a telematics terminal, the method comprising:
    transmitting driving information including a current position of the electric vehicle and information on a destination to a telematics server;
    receiving information on at least one candidate route from the current position to the destination and expected power consumption corresponding thereto from the telematics server;
    displaying the at least one candidate route and the expected power consumption corresponding thereto;
    transmitting information on a desired route selected from among the at least one candidate route to the telematics server;
    receiving information on expected cost of charging stations from the telematics server; and
    displaying the expected cost of the charging stations.

8. The method of claim 7, further comprising:
    receiving average power consumption corresponding to each of the at least one candidate route from the telematics server; and
    displaying the average power consumption.

9. The method of claim 7, further comprising:
    transmitting information on a selected charging station to the telematics server;
    receiving information on a route passing the selected charging station from the telematics server; and
    displaying the route passing the selected charging station.

10. The method of claim 9, further comprising:
    receiving updated information on the expected power consumption according to the route passing the selected charging station from the telematics server; and
    displaying the updated information on the expected power consumption.

11. A telematics terminal for providing driving route information of an electric vehicle, the telematics terminal comprising:
    an information collector configured to collect driving information of the electric vehicle;
    a terminal communicator configured to communicate with a telematics server;
    an input interface configured to receive information on a destination from a user;
    an output display configured to display an electronic map; and
    a terminal controller configured to control the terminal communicator to transmit the driving information to the telematics server and the output display to display at least one candidate route from a current position of the electric vehicle to the destination and expected power consumption corresponding thereto,
    wherein the terminal controller controls the output display to display expected cost of charging stations.

12. The telematics terminal of claim 11, wherein the terminal controller controls the output display to display average power consumption corresponding to each of the at least one candidate route.

13. The telematics terminal of claim 11, wherein if a charging station is selected, the terminal controller controls the output display to display a route passing the selected charging station.

14. The telematics terminal of claim 13, wherein the telematics controller controls the output display to display updated information on the expected power consumption according to the route passing the selected charging station.

15. A telematics server for providing driving route information of an electric vehicle, the telematics server comprising:
- a server communicator configured to communicate with a telematics terminal and charging stations;
- a database configured to store driving information received from the telematics terminal and charging station information received from the charging stations; and
- a server controller configured to process transmitted/received information through the server communicator and information stored in the database,
- wherein the controller is operated by a predetermined program, the predetermined program performs:
- checking a driving pattern of a driver corresponding to the electric vehicle;
- checking information on a current position and a destination of the electric vehicle;
- calculating at least one candidate route from the current position to the destination;
- calculating expected power consumption corresponding to the at least one candidate route based on the driving pattern, the current position, and the destination; and
- transmitting information on the at least one candidate route and the expected power consumption corresponding thereto to the telematics terminal.

* * * * *